A. E. HEWETT.
Churn.
No. 42,481. Patented April 26, 1864.
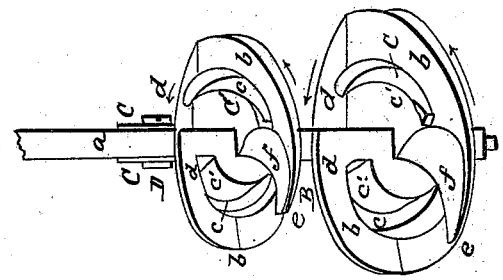
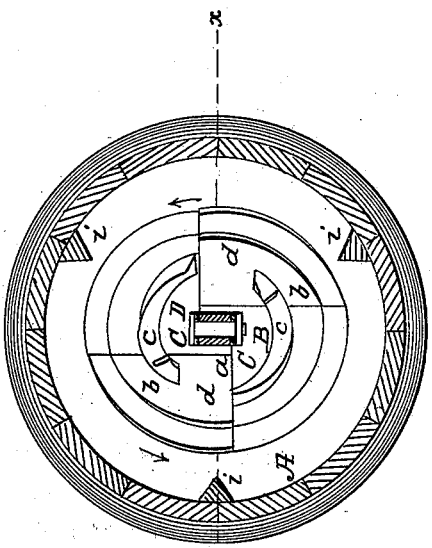
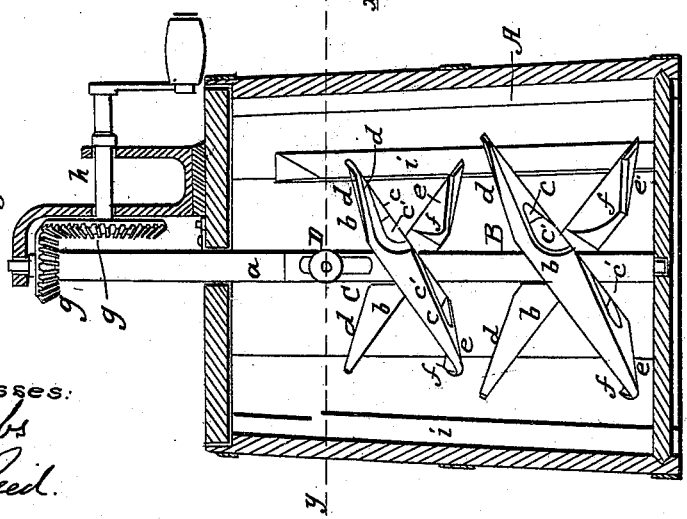
Witnesses:
Inventor:

UNITED STATES PATENT OFFICE.

A. E. HEWETT, OF HOMER, NEW YORK.

IMPROVEMENT IN CHURNS.

Specification forming part of Letters Patent No. 42,481, dated April 26, 1864.

*To all whom it may concern:*

Be it known that I, A. E. HEWETT, of Homer, in the county of Cortland and State of New York, have invented a new and Improved Churn; and I do hereby declare that the following is a full, clear, and exact description of the same, reference being had to the accompanying drawings, making a part of this specification, in which—

Figure 1 is an elevation of my invention, the churn-box being bisected vertically, as shown by the line $x\,x$, Fig. 2; Fig. 2 a horizontal section of the same, taken in the line $y\,y$, Fig. 1; Fig. 3, a detached perspective view of the dasher.

Similar letters of reference indicate corresponding parts in the several figures.

This invention relates to a new and useful improvement in the dasher of the churn, which dasher is of the rotary spiral class.

The invention has for its object the forcing of the cream in a vertical current downward, at or near the edges of the dasher, and upward at the side of the churn-box, the cream at the same time being prevented from rotating with the dasher, and caused to move outward from the dasher-shaft, where the dasher has but little effect, to the edges of the dasher, the latter being also so constructed as to admit of being adapted to the height of the cream in the churn, and capable of being used with great advantage for gathering butter, as well as for expeditiously producing the same from the cream.

To enable those skilled in the art to fully understand and construct my invention, I will proceed to describe it.

A represents the body or box of the churn, which may be of slightly-conical form; and B is the dasher, which is composed of a vertical shaft, $a$, having spiral blades $b$ attached to it in pairs, the two blades of each pair being placed opposite each other, and having a reverse position relatively with each other, as shown clearly in Fig. 1. These blades are each rather more than a semicircle, so that their ends will overlap, and each blade has a curved concentric slot, $c$, made in it, the outer sides of which are vertical and the inner sides (marked $c'$) inclined, so that their upper edges will be farther outward from the shaft $a$ than their lower edges. (See Fig. 3.) The upper and lower surfaces of the elevated ends of the blades $b$ are chamfered off, as shown at $d$, so as to form a less inclined surface than the other parts of the blades, and the lower parts of the blades, at their under surfaces, are chamfered so as to assume nearly a horizontal position, as shown at $e$, while the upper surfaces of the lower parts of the blades are scooped or hollowed out, as shown at $f$. (See more particularly in Fig. 3.)

Two pairs of blades, $b$, are shown attached to the shaft $a$, and the lower pair are permanently attached to it, while the upper pair is movable and capable of being adjusted higher or lower on the shaft, according to the quantity of cream in the churn-box. These adjustable blades may be secured to the shaft by having slotted plates C attached to them, one to the center of the inner edge of each blade, and a screw-bolt, D, passing through the slots in the plates and through the shaft $a$. Other plans, however, may be employed for connecting the blades to the shaft, so as to admit of their removal from the shaft and vertical adjustment thereon.

The lower end of the shaft $a$ is stepped centrally at the bottom of the churn-box A, and said shaft is rotated by bevel-gears $g$ and a crank-shaft, $h$, at the top of the churn. During the process of churning the dasher is rotated in the direction indicated by the arrow, and the blades $b$ have a tendency to force or press the cream downward, while the inner oblique sides, $c'$, of the slots $c$ have a tendency to force the cream outward from the shaft $a$ toward the outer parts of the blades, where the latter acts most efficiently, the pressing and forcing down of the cream underneath the blades, causing the former to rise at the inner side of the box A and a vertical current is produced, the cream being prevented from rotating with the dasher by means of vertical ribs $i$, attached to the inner side of the box A, in connection with the chamfered surfaces of the blades at their upper and lower parts.

In gathering the butter after churning, the dasher is gently turned in the reverse direction, and the blades $b$ then have a tendency to force upward the cream, and the particles of butter all rise and are united in masses at the surface of the cream. The chamfered ends of the blades $b$ aid materially in gathering the butter, as they prevent an abrupt action of the blades on the cream and a consequent undue agitation of the cream. By having the ends of the blades overlap a continuous or uniform action of the latter on the cream is obtained.

Having thus described my invention, what I claim as new, and desire to secure by Letters Patent, is—

1. The blades $b$, attached to the shaft $a$ obliquely in pairs, and provided with concentric curved slots $c$, having their inner sides, $c'$, inclined, and the upper and lower parts of the blades having champered surfaces $d\ e\ f$, substantially as shown, to form a new and improved churn-dasher, as set forth.

2. The vertical ribs $i$ at the inner side of the churn-box A, in combination with the rotary dasher B, for the purpose set forth, constructed and operating as above specified.

A. E. HEWETT.

Witnesses:
 J. M. PIERCE,
 R. A. GOODELL.